J. W. SOUTHER.
SHIPPING JACK.
APPLICATION FILED FEB. 1, 1917.
1,228,983.
Patented June 5, 1917.
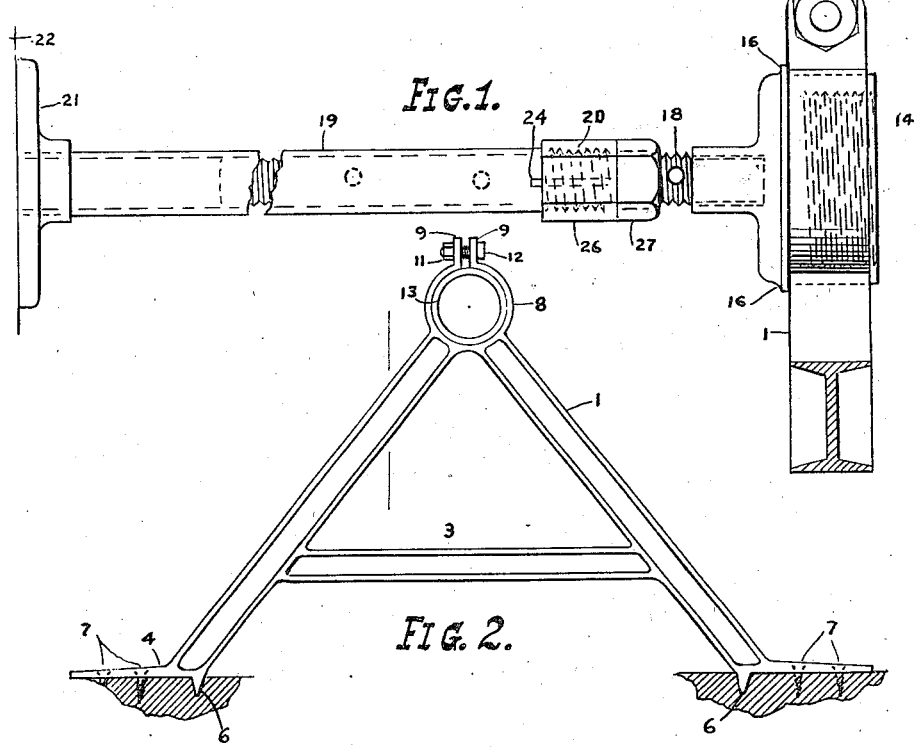
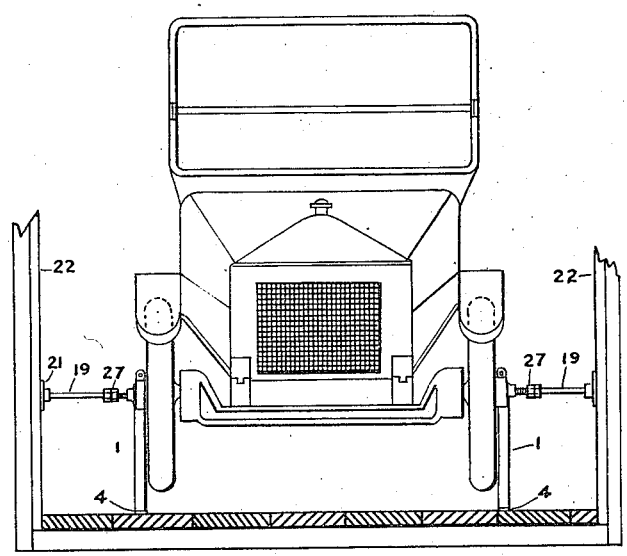
INVENTOR
J. W. SOUTHER
By J. M. Wright
Attorney

UNITED STATES PATENT OFFICE.

JOSEPH W. SOUTHER, OF SAN FRANCISCO, CALIFORNIA.

SHIPPING-JACK.

1,228,983.  Specification of Letters Patent.  Patented June 5, 1917.

Application filed February 1, 1917. Serial No. 145,982.

*To all whom it may concern:*

Be it known that I, JOSEPH W. SOUTHER, a citizen of the United States, residing at San Francisco, in the county of San Francisco and State of California, have invented new and useful Improvements in Shipping-Jacks, of which the following is a specification.

The object of the present invention is to provide an improved shipping jack for supporting automobiles on railroad cars which will be efficient and convenient in use and simple and inexpensive in construction.

In the accompanying drawing, Figure 1 is a broken front view of my improved shipping jack; Fig. 2 is a side view of the same on a reduced scale; Fig. 3 is a front view of an automobile supported thereby.

Referring to the drawing, 1 indicates a frame composed of eye-bars, two 2 of which extend obliquely upward at an angle of about 45°, and converge, and the third 3 extends horizontally and connects the lower portions of the obliquely extending bars 2. Said bars are formed at their lower ends with foot-plates 4, which have prongs 6 adapted to penetrate the floor of the car, and are also adapted to be secured to said floor by screws 7. The upper ends of the converging bars 2 are integrally connected with a divided ring 8, having parallel outward extensions 9, which are adapted to be drawn together by means of a nut 11 on a bolt 12, passing through said extensions. The said ring can thus be clamped around a cylindrical socket-piece 13, having an internally threaded socket 14 adapted to be screwed on to a special externally-threaded cap, (not shown) secured on the hub of a wheel of an automobile. Said socket-piece is formed with a shoulder 16 adapted to abut against an edge of the ring 8, and at its other ends is reduced in diameter and receive the smooth end of a screw 18. Said screw is screwed into an internally threaded tube 19, having an end secured in foot-plate 21, which rests against a side 22 of a car. The other end of the tube 19 is externally threaded as shown at 20 and split, as shown at 24, and on said threaded end is screwed a clamping nut 26, by which the split portions of the tube can be contracted around the screw 18. A lock-nut 27 is then screwed on the screw 18, and bears against the adjacent end of the clamping nut 26.

When all four wheels of the automobile are thus supported from the floor by the frames 1 and also against a lateral movement by the braces 19, the automobile is very firmly secured in position during transportation.

I claim:—

1. In means for securing an automobile in a freight-car, a socket piece having in opposite sides independent sockets, one of the said sockets being adapted to receive an end of an axle of an automobile, and means substantially in line with said axle and received in the other socket for pressing against said socket piece and against the side of the freight-car.

2. In means for securing an automobile in a freight-car, a socket piece having in opposite sides independent sockets, one of the said sockets being adapted to receive an end of an axle of an automobile, and means substantially in line with said axle and adjustable in length and received in the other socket for pressing against said socket piece and against the side of the freight-car.

3. In means for securing an automobile in a freight-car, a frame composed of bars converging at their upper ends, their lower ends being adapted to rest upon the floor of the freight-car and a tie bar connecting said converging bars, a socket piece, means for securing the socket piece on the upper end of said frame, said socket piece being formed on one side to receive the end of an axle of the car and on the other side to receive an end of a brace, a brace, one end of which is received in said socket piece and a foot piece on said other end arranged to rest against a side of the freight-car.

4. In means for securing an automobile in a freight-car, a frame composed of bars converging at their upper ends, their lower ends being adapted to rest upon the floor of the freight-car and a tie bar connecting said converging bars, a socket piece, means for securing the socket piece on the upper end of said frame, said socket being formed on one side to receive the end of an axle of the car and on the other side to receive an end of a brace, an extensible brace, one end of which is received in said socket piece and a foot piece on said other end arranged to rest against a side of the freight-car.

5. In means for securing an automobile in a freight-car, a frame composed of bars converging at their upper ends, their lower ends being adapted to rest upon the floor of the freight car and a tie bar connecting said converging bars, a socket piece, means for securing the socket piece on the upper end of said frame, said socket piece being threaded on one side to receive the end of an axle of the car and on the other side to receive an end of a brace, a brace, one end of which is received in said socket piece and a foot piece on said other end arranged to rest against a side of the freight-car.

6. In means for securing an automobile in a freight-car, a frame composed of bars converging at their upper ends, their lower ends being adapted to rest upon the floor of the freight car and a tie bar connecting said converging bars, a socket piece, means for securing the socket piece on the upper end of said frame, said socket piece being formed on one side to receive the end of an axle of the car and on the other side to receive an end of a brace, an extensible brace and means for locking said extensible brace in its extended position, one end of which is received in said socket piece and a foot piece on said other end arranged to rest against a side of the freight-car.

7. In means for securing an automobile in a freight-car, a socket piece for supporting an end of an axle of an automobile and having a socket, an internally threaded tube adapted to be supported at one end against the side of the freight car, a screw screwed in said tube and received in a socket in said socket piece and means for turning the screw.

8. In means for securing an automobile in a freight-car, a socket piece for supporting an end of an axle of an automobile and having a socket, an internally threaded tube adapted to be supported at one end against the side of the freight car, a screw screwed in said tube and received in a socket in said socket piece, the tube being split at the end surrounding the screw, and a clamping nut screwed on said tube for contracting said split end around the screw.

9. In means for securing an automobile in a freight-car, a socket piece for supporting an end of an axle of an automobile and having a socket, an internally threaded tube adapted to be supported at one end against the side of the freight car, a screw screwed in said tube and received in a socket in said socket piece, the tube being split at the end surrounding the screw, and a clamping nut screwed on said tube for contracting said split end around the screw, and a lock nut screwed on said screw and bearing against said clamping nut.

JOS. W. SOUTHER.